3,014,837
PESTICIDE
Henderikus Obias Huisman, Jan Hendrik Uhlenbroek, and Martinus Johannes Koopmans, Weesp, Netherlands, assignors, by mesne assignments, to North American Philips Company, Inc., New York, N.Y., a corporation of Delaware
No Drawing. Filed June 11, 1956, Ser. No. 590,404
Claims priority, application Netherlands June 20, 1955
18 Claims. (Cl. 167—30)

The agents used in agriculture, horticulture and fruit growing to combat fungi or bacteria, to both of which will be referred to hereinafter as micro-organisms, have frequently the disadvantage that they may be at the same time more or less harmful to the plants to be protected from micro-organisms.

There are also substances, for example trichloromethyl-thiolsulphonates or organic mercury compounds that could be used on a larger scale to combat micro-organisms in agriculture, horticulture and fruitgrowing, if their phytotoxical effect on the cultivated plants were not comparatively great. In order to avoid affection by particular kinds of micro-organisms, many cultivated plants must therefore be treated with means which are, properly speaking, less suitable for this purpose.

In accordance with the invention it was now found that aromatic compounds having a fungicidal or bactericidal effect have (small) phytotoxicity, if to one of the carbon atoms of the aromatic nucleus there is bound an acylated amino group.

The invention relates to a method of producing agents for combating micro-organisms and is characterized in that a compound of the general formula:

R—NH-acyl is produced, wherein R designates an aromatic residue, of which one of the hydrogen atoms bound to a carbon atom of the aromatic nucleus is replaced by an acyl-amino group and one or more of the further hydrogen atoms of the aromatic nucleus is replaced by a group giving the compound fungicidal and/or bactericidal properties. The aromatic nucleus may be a phenyl- or a naphthyl-nucleus. The acyl group may be the acyl residue of a saturated or unsaturated, aliphatic carbonic acid or, also of a mixed aliphatic-aromatic or an aromatic carbonic acid, for example formic acid, acetic acid, propionic acid, butyric acid, valeric acid, stearic acid, palmitic acid, crotonic acid, acrylic acid, oleic acid, phenyl-acetic acid, phenyl-propionic acid, phenyl-butyric acid, benzoic acid; $\alpha$ and $\beta$ naphthoic acid.

The term fungicide is to be understood to mean herein a compound having an $LD_{95}$ of at least 3 $p_C$ units in the experiments to be described hereinafter. A bactericide is to be understood to mean a compound which, in the experiments to be described hereinafter, in a concentration of $10^{-4}$ mol/ml. of at least one of the bacteria employed in the experiments to be described produces a conspicuous reduction of the growth. A compound having a phytotoxic effect is to be understood to mean a compound which damages the leaves of Indian cress in the experiments to be described hereinafter in a concentration of at least 10%, sprayed in a quantity of 10 cm.³ of these 10% solutions on 1000 cm.² of leaf surface. It may be pointed out that it is known that acyl-amino compounds exert a smaller poisonous effect in some cases on living organisms than the corresponding non-acylated amino-compounds. This phenomenon is particularly employed in animal physiology. With respect to this known fact, the invention, however, provides a completely new insight, since it has not yet been recognized that aromatic fungicides or bactericides have substantially no phytotoxic effect, if an acylated amino group is bound to a carbon atom of the aromatic nucleus.

The invention is of particular importance to reducing the phytotoxic effect of aromatic fungicides and/or bactericides. It has been found that the phytotoxic effect of aromatic fungicides and/or bactericides, in which no acylated amino group is bound to the aromatic nucleus, is materially higher than the phytotoxic effect of aromatic fungicides and/or bactericides of which the formula corresponds to fungicides and/or bactericides referred to in the beginning of this paragraph, from which they differ, however, in that a hydrogen atom bound to a carbon atom of the aromatic nucleus is replaced by an acylated amino group. In accordance with a preferred embodiment of the invention compounds of the general formula: R—NH-acyl are produced, in which R designates and aromatic residue substituted in a manner such that the compound RH is an aromatic fungicide and/or bactericide with phytotoxic effect. To the compounds of the formula RH apply, of course, the aforesaid definitions for fungicides, bactericides and compounds having a phytotoxic effect.

The fungicidal and/or bactericidal activity of the amino-acylated compounds may be lower than that of the non-amino-acylated compounds, but the difference in this effect is materially smaller than the difference in the phytotoxic effect of the amino-acylated compounds and of the non-amino-acylated compounds. On the other hand, owing to the introducion of an acyl-amino group the fungicidal or the bactericidal effect may increase, while in many cases this activity does not vary. According to the invention the phytotoxic effect of an aromatic fungicide or bactericide will decrease owing to the introduction of an acyl-amino group at the aromatic nucleus.

Hydrogen atoms of the aromatic nucleus of the compounds according to the invention may be substituted by groups of very different chemical structure. These groups may, for example, have the following structure: $SO_2SCCl_3$; —$Hg.O.CO.CH_3$; —$N:C:S$.

The compounds according to the inveniton can be produced in various ways. The acylated-amino group can be introduced into a compound of the formula RH, but as an alternative the starting material may be an aromatic compound, in which the acyl-amino group is already contained, this compound being then modified in a manner such that the compound R—NH-acyl is obtained.

The last-mentioned method will be especially preferred when the substituents in the aromatic nucleus of the compound R—NH-acyl are chemically reactive and would decompose, if it would be attempted to introduce an acyl-amino group into aromatic compounds containing these groups.

If the compound R—NH-acyl is of a complicated structure, the substituents in the aromatic nucleus may be introduced in parts, the introduction of a further group being started before the substitution has been completed.

For the introduction of an amino-group into an aromatic nucleus various methods are available (see among others Karrer, Organic Chemistry 1938, page 412, for method of producing aromatic amines). An aromatic compound may, for example, be nitrated with nitric acid to obtain a nitro-compound, which substance is then reduced to the corresponding amine. This reduction may, for example be effected with tin and hydrochloric acid or with iron and hydrochloric acid, but, if necessary, it may be carried out electro-chemically or by catalytic hydrogenation, for example under the action of Raney nickel, platinum- or palladium-catalysts. In a further method the amino group is introduced into the aromatic nucleus by converting an aromatic halide with ammonia.

It is furthermore possible, in certain cases, for example with resorcinol, to replace an aromatic hydroxyl-group by an amino group under the action of ammonia, if the reaction mixture contains sulphite. Finally, aromatic carboxylic acids may be converted into the corresponding amines by the so-called Hofmann or Curtius method, which is carried out via the acid amides and the acid azides respectively.

The aromatic amino compounds may be converted into the corresponding acyl compounds by acylating the amino groups with an acid halide, for example, acetic acid chloride, a carboxylic acid, for example, formic acid, acetic acid, propionic acid or with an acid anhydride, for example acetic acid anhydride, propionic acid anhydride.

As stated above, the fungicidal or the bactericidal groups may, if desired, be introduced subsequent to the introduction of the amino group and prior to the acylation: the said groups would be decomposed or separated out, if the aromatic compound, already containing these functional groups, would be aminated.

The invention is of particular importance for the production of fungicides and/or bactericides of the general formulae:

(A) 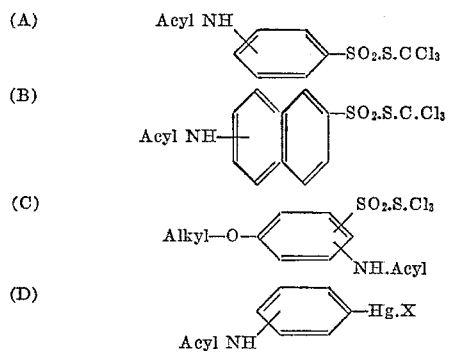

(B)

(C)

(D)

wherein X designates an inorganic or an organic anion, for example an organic acid residue or a halogen ion, for example Cl, Br.

(E) 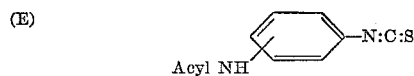

In all these formulae acyl designates an acid residue of an aliphatic, saturated or unsaturated carboxylic acid or a mixed aliphatic-aromatic carboxylic acid or of an aromatic carboxylic acid, for example an acid residue of acetic acid, propionic acid, valeric acid, butyric acid, stearic acid, palmitic acid, acrylic acid, crotonic acid, oleic acid, phenyl-acetic acid, phenyl-propionic acid, phenyl-butyric acid, benzoic acid, α and β naphthoic acid.

The compounds of the general formula:

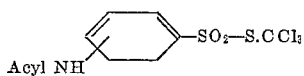

may be produced by causing a compound of the formula:

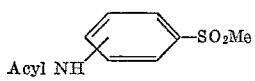

wherein Me designates a metal atom, preferably an alkaline atom, for example a sodium atom, to react with perchlormethylmercaptane (referred to hereinafter by P.C.M.), in the presence of a solvent. The solvent is preferably water, in which case the reaction can be best carried out at a temperature between 0° C. and 30° C. The reaction may also be carried out in an a-polar solvent, for example, petroleum ether or benzene. In such a case it is advisable to carry out the reaction at a higher temperature than the aforesaid value, for example, between 60° C. and 100° C.

One of the starting materials for the aforesaid reaction is an acyl-amino benzene sulphinate. This compound could be produced, for example when the acyl-amino group occupies the ortho-position relative to the sulphinate group, by converting ortho-nitro chlor-benzene with sodium sulphide into a compound of the formula:

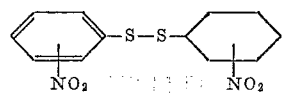

Dissolved in acetic acid, this compound can be chlorinated with gaseous chlorine to obtain O-nitric benzene-sulpho-chloride.

By reduction with sodium sulphite the O-nitro benzene-sulphinic acid is obtained therefrom, which can be converted by subsequent catalytic reduction with hydrogen and Raney nickel into the corresponding amino compound. From the latter compound can be obtained O-acetyl-amino-benzene sulphinate by means of acetic acid anhydride and subsequent neutralization by means of a lye.

This reaction is an example of those reactions in which a substituent is produced at the aromatic nucleus first in part and then the acyl-amino group bound to the benzene nucleus is completed, after which the substitution is completed.

With respect to the compounds of the general formula:

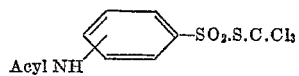

it should be noted that particularly the para-acyl-amino compounds are of importance.

The compounds of the general formulae:

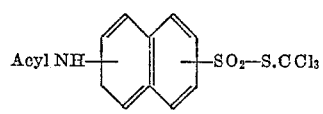

and

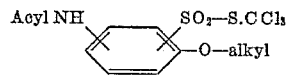

may be produced in a manner similar to that referred to above with respect to the compounds of the general formula:

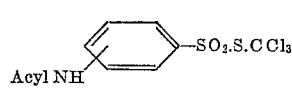

This means, that these compounds may be produced by causing P.C.M. to react with

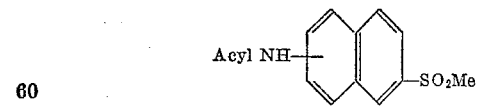

or with

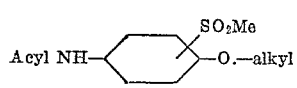

In these formulae Me designates again a metal ion, preferably an alkaline ion, for example a sodium ion. In these cases the reaction with P.C.M. may also be carried out in aqueous medium at a temperature of 0° to 30° C.

Of the compounds of the general formula:

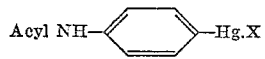

wherein X designates an inorganic or an organic anion, for example, an acetate, propionate or butyrate anion or a halogen ion, for example, a chlorine or bromine ion, or a phosphate ion, particularly those compounds are of importance in which X designates an acetate anion and the group of acyl NH— occupies the para-position in the benzene nucleus. The compounds may be produced by mixing an aqueous solution of mercury acetate with aniline and by acylating the p-amino-phenyl mercury acetate with an acid anhydride, for example acetic acid anhydride.

The compounds of the general formula:

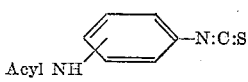

may be produced by causing an acyl-amino aniline to react with carbon disulphide and by decomposing the thiourea derivative with acetic acid anhydride. With the para compounds of this series satisfactory results were obtained.

The compounds obtained by carrying out the method according to the invention may be worked up in various ways to obtain fungicidal and/or bactericidal preparations. Potential methods of working up are:

(a) Mixable oils containing 15 to 20% active constituent, 15% non-ionogeneous emulsifier and otherwise solvents (mainly ketones, for example cyclohexanone);

(b) Aerosols, the solvents being for example acetone, methyl-ethyl-ketone and cyclohexanone, the propellent being methyl-chloride or freon;

(c) Sprayable powders containing 50 to 80% active substance and otherwise flowing liquids, for example, fatty alcohol sulphonates, and disperging agents and/or carriers, for example kaoline, chalk, clay and admixtures to prevent lumping, for example, colloidal silicic acid;

(d) Sprayable powders containing for example 5% active substance in a mixture of infusorial silica, magnesium marlstone;

(e) Seed-protecting means, for example, 50% of the active substance combined with kaoline with the addition of adhesives, for example, watchmaker's oil;

(f) So-called "coated dust," the active substance being applied to an absorbing carrier, for example infusorial silica.

In the examples hereinafter methods of producing compounds according to the invention are described. (The temperatures in these examples are expressed in degrees centigrade.) The examples are followed by tables, in which the phytotoxic and fungitoxic properties of the amino-acylated and the non-amino-acylated compounds are indicated. The numerals indicated in each table for activity refer to a biological specimen series. The numerals of each table referring to a particular activity can be compared with one another. Of a few compounds indicated in the tables no examples are given. These compounds were produced in accordance with prescriptions known from literature. The method of determining the fungitoxic effect of the tested compounds was performed as follows:

The compound to be tested was dissolved in acetone and so-called dilution series were made of this solution, this series being obtained by reducing each time the concentration of the compound to be tested by a factor 2. A few drops of each of these solutions of a size of 1 to 100 ml. were applied to glass plates, within paraffin rings provided thereon. The acetone was caused to evaporate, after which a drop of a size of 0.05 ml. of a suspension containing 10,000 spores of fusarium culmorum per ml. of medium was caused to flow within each ring. The medium was aqueous, diluted cherry extract having a dry-substance content of 0.1%. The glass plates were then kept in a humid space at 24° C. for 18 hours. It was then stated microscopically with what concentration of the compound to be tested the spores of fusarium culmorum had no longer been able to germinate or showed still some signs of life in the form of swellings, and of a small percentage of very short cotyledons. This limit concentration was referred to as $LD_{95}$, i.e this concentration means a lethal dose for 95% of the number of spores exposed to this concentration of the substance to be tested. This LD value was indicated in so-called $p_C$ units. These are the negative logarithms (base 10) of the concentration, expressed in grams per ml. Expressed in $p_C$ units, the dilution with a factor 2 (as stated above) corresponds to an increase of $p_C$ by 0.3 unit.

In one case the $LD_{95}$ of a compound to be tested was ascertained not only on the basis of fusarium culmorum, but also with nine further fungi (Tables H1 and H2). The concentrations indicated relate all to the quantity of active substance in the solutions of the dilution series.

The bactericidal effect was determined as follows. The compound to be tested was dissolved in acetone or suspended in water containing 2% of carboxymethyl-cellulose: of this solution or suspension a dilution series was made, the concentration of each term of the series differing by a factor 10 from that of the next-following term. 0.1 to 0.2 ml. of each solution was dispersed in 20 ml. of a nutrient containing 1% of peptone, 0.3% of meat extract (both of the trademark "Difco," 1% of glucose, 0.3% of a product known under the trade name of "Poviet," 1% of $KH_2PO_4$, 2.5% of agar-agar of the trade name of "Bacto" and otherwise main water (pH 6.8). These nutrients were then moculated with suspensions of the following bacteria: *Pseudomonas pyocyaneas, Escherichia coli, Mycobacterium phlei, Bacillus subtilis, Salmonella thyrium, Micrococcus aureus.* Then the nutrients were kept at a temperature of 37° C. for 24 to 48 hours. For each dilution series the concentration of the tested compound was ascertained, which had just been able to bring about a total or substantially total reduction of the growth of the bacteria. This limit concentration was indicated by $p_C$, which designates the negative logarithm (base 10) of the limit concentration expressed in gram molecules/ml. When it was found that within a dilution series the concentration of the tested compound was not so high as to produce reduction of growth, it was indicated in the associated table by a hyphen.

The phytotoxic effect of the tested compounds was determined by spraying acetonic solutions or aqueous suspensions of the substances to be tested in a given concentration on test plants.

The quantity of liquid sprayed on the plants was 10 ml. per 1000 cm.$^2$ of leaf surface, on which the test specimen were provided. The plants used for these experiments had in general height of 7 to 12 cms. Only in the case of the Indian cress use was made of cut leaves, which were put with their stems in a bottle of water after the treatment. After having been sprayed, the plants or, in the case of the Indian cress, the leaves were put aside and kept at a temperature of 22° C. for five days. During this period the specimen were exposed to fluorescent tubes of the day-light type, whilst daylight was screened off. At the end of this period the measure of burning of the leaves was determined. It was expressed as follows:

0 = no visible damage,
1 = not more than 1/10 of the leaf surface (of the whole plant) is damaged,
2 = the damage is found on 1/10 to 1/3,
3 = 1/3 to 2/3 is burnt,
4 = 2/3 to 9/10 affected,
5 = almost the whole plant (more than 9/10) is destroyed,
6 = the plant has died.

The experiments showed that the phytotoxic effect of the same compound in the same concentration is the same in an acetone solution of the compound and in an aqueous suspension thereof. Blank experiments with acetone showed that the solvent in itself does not produce any damage to the leaves.

(A). Compounds of the general formula:

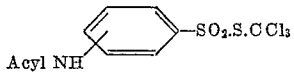

I. TRICHLORMETHYL-BENZENE THIOLSULPHONATE

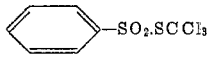

This compound was produced in accordance with a prescription published in Rec. Trav. chim. 71, 1082 (1952).

II. TRICHLORMETHYL-p-ACETAMINOBENZENE THIOLSULPHONATE

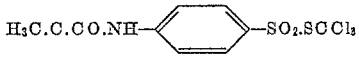

To a solution of 440.5 g. (2 mol.) sodium salt of p-acetaminobenzene-sulphinic acid prepared by a method described in Organic Synthesis Col., vol. I, page 7 (1941), in 3000 ml. of water subsequent to the addition of 25 g. of sodium bicarbonate, was added 595 g. (3.2. mol.) of P.C.M. in drops, while the liquid was stirred vigorously. After the reaction the precipitated trichlormethyl p-acetaminobenzene-thiolsulphonate was filtered off, washed thoroughly with water and dried. The yield was 680 g. of this compound (98%, calculated on sulphinate). The melting point was 156° to 158° C.

III. TRICHLORMETHYL-p-FORMAMINO-BENZENE-THIOLSULPHONATE

20.0 g. (0.165 mol.) of formanilide was added with stirring, in spoonfuls to 100 g. (0.86 mol.) of chlorsulphonic acid. The reaction temperature was kept below 25° C. Then the reaction mixture was heated at 90° C. for some time, then cooled and poured out on ice. The p-formaminobenzene sulphochloride precipitated as a solid mass; this was filtered off and washed thoroughly with ice water.

The wet, raw sulphochloride was added to a solution of 80 g. of $Na_2SO_3.7H_2O$ in 125 ml. of water. At a temperature of about 35° C., with stirring, 50% aqueous caustic soda was then added in drops so that the reaction mixture remained just slightly alkaline. With slight development of heat the sulphochloride dissolved, while the sodium salt of p-formaminobenzene-sulphinic acid crystallized out.

At the termination of the reaction the mixture was cooled and the precipitated sulphinate was filtered off and dried at 120° C. The product obtained (24.0 g.) contained, as was found by oxydimetric determination 83% of the sodium salt of p-formaminobenzene-sulphinic acid (58%, calculated on formanilide).

15 g. of this raw sodium salt of p-formaminobenzene-sulphinic acid was suspended in 150 ml. of dry benzene. To the suspension was added 13.5 g. of P.C.M., after which the mixture was refluxed, with stirring.

Then the reaction mixture was filtered hot. The filtrate was extracted once with boiling benzene. From the common benzenic filtrates crystalled out, subsequent to cooling, 12.25 g. of substantially pure trichlormethyl-p-formaminobenzene-thiolsulphonate, having a melting point of 115° to 116° C. (Yield 50%, calculated on sulphinate.)

IV. TRICHLORMETHYL-p-CROTONYLAMINO-BENZENE-THIOLSULPHONATE

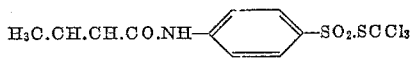

22.8 g. of crotonylanilide (0.14 mol.) was converted, in accordance with Example VII, with 100 g. (0.86 mol.) of chlorsulphonic acid into the p-crotonylamino-benzene-sulphochloride. Subsequent to recrystallization 20.2 g. of the product (i.e. a yield of 55%) having a melting point of 118° to 125° C. was obtained.

15 g. of this sulphochloride (0.085 mol.) was reduced in the conventional manner with a solution of 22 g. $Na_2SO_3.7H_2O$ (0.087 mol.) in 60 ml. of water while 6 ml. of 50% caustic soda was added in drops, at about 40°. The yield was 7.8 g. of the sodium salt of p-crotonylaminobenzene-sulphinic acid having a content of pure substance of 96% (yield: 53%, calculated on sulphochloride).

4 g. (0.15 mol.) of this sulphinic acid was converted in the conventional manner with 3.4 g. of P.C.M. (0.018 mol.) in 50 ml. of benzene into the trichlormethyl-p-crotonylamino-benzene-thiolsulphonate. After recrystallization by solution in ethylacetate and precipitation from petroleum ether, 3.3 g. (yield: 57% calculated on sulphinic acid) of this compound having a melting point of 106° to 107.5° C. was obtained.

V. TRICHLOR-p-ISOBUTYLAMINO-BENZENE-THIOLSULPHONATE

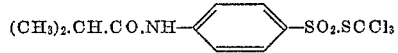

By the method described in Example VII, starting from 25.0 g. of iso-butylanilide (0.15 mol.) and 89 g. of chlorsulphonic acid (0.76 mol.), 19.5 g. of p-isobutyroylamino-benzene-sulphochloride with a melting point of 123° C. to 126° C. was obtained.

This sulphochloride (0.075 mol.) was converted, in accordance with Example VII, with 28.0 g. of $Na_2SO_3.7H_2O$ in 70 ml. of water, while 7 ml. of 50% caustic soda was added in drops, into the sodium salt of p-isobutyroylaminobenzene-sulphinic acid 12.5 g. of the product with a content of 74% of pure compound (yield 50%, calculated on sulphochloride) was obtained.

12.0 g. (0.035 mol.) of this sulphinic acid was treated, in accordance with Example III, in 200 ml. of dry benzene with 10 g. (0.054 mol.) of P.C.M. The benzenic filtrate, obtained after filtering the hot reaction mixture, yielded, subsequent to evaporation, a viscous oil, which was applied in benzenic solution, to a column of slightly acid aluminum oxide. After having washed out the column with petroleum-ether (1½ l.) the compound was eluated with about 1½ benezene. After evaporation of the benzene fraction, a viscous oil was obtained, which crystallized after some time. After recrystallization from benzene/petroleum-ether, 12.5 g. of not quite pure trichloromethyl-p-isobutylaminobenzene - thiolsulphonate with a melting point of 75° to 78° C. was obtained (yield: 93%, calculated on sulphinic acid).

VI. TRICHLOROMETHYL-p-BUTYLAMINO-BENZENE-THIOLSULPHONATE

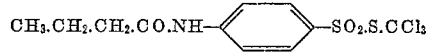

From 24.5 g. of butylanilide (0.15 mol.) and 87.5 g. of chlorsulphonic acid (0.75 mol.), in accordance with Example VII, 24.5 g. (62%) of p-butylaminobenzene-sulphochloride with a melting point of 114° to 116.5° C. was obtained.

18.0 g. of this sulphochloride (0.69 mol.) was reduced, in accordance with Example VII, with the aid of a solution of 35.0 g. of $Na_2SO_3.7H_2O$ in 70 ml. of water, while adding 50% caustic soda in drops. The final product obtained had a weight of 15.0 g. and contained 99% of p-butylamino-benzene-sulphinic acid-sodium (yield: 87%, calculated on sulphochloride).

7.0 g. of this sulphinic acid (0.028 mol.) was dissolved in 40 ml. of water and after the addition of 0.4 g. of sodium bicarbonate at room temperature with 5.3 g. of P.C.M. (0.0285 mol.) it was vigorously shaken. A viscous oil was separated out, which was isolated by extraction with diethyl ether. After drying the etheric solution on $Na_2SO_4$ (aq. and evaporation of the ether, a very viscous oil remained, which, after some time, crystallized. 6.2 g. of trichlormethyl-p-butyl-amino-benzene-thiolsulphonate with a melting point of 58° to 62° C. was thus isolated (yield: 58%, calculated on sulphinate).

VII. TRICHLORMETHYL-p-PROPIONYLAMINO-BENZENE-THIOLSULPHONATE

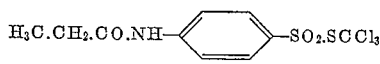

30.0 g. of propionylanilide (0.2 mol.) was added, while stirred with 15° to 25° C., in spoonfuls to 116.5 g. (1 mol.) of chlorsulphonic acid, after which the mixture was heated at 60° C. for one hour. The cooled reaction mixture was poured out on ice and the sulphochloride separated out isolated by extraction with diethyl ether, by washing and drying of the etheric solution and evaporation of the ether. After recrystallization from a mixture of benzene/petroleum ether 25.5 g. of p-propionylaminobenzene-sulphochloride with a melting point of 111° to 113° C. was obtained.

20.0 g. (0.081 mol.) of this sulphochloride was added to an aqueous solution of 30.5 g. of $Na_2SO_3.7H_2O$. When adding in drops 50% caustic soda, while stirring, so that the reaction mixture remained just slightly alkaline, and at a reaction temperature of 35 to 40° C., the sulphochloride dissolved. Then the reaction mixture was filtered, cooled and acidified with icy hydrochloric acid (1:2). The sulphinic acid, which then crystallized out, was filtered out, washed with cold water and dissolved with the same quantity of 2 N caustic soda. The neutral solution obtained was evaporated to dryness in vacuo. The residue contained, after drying at 120° C., 97% of the sodium salt of p-propionylaminobenzene-sulphinic acid and had a weight of 14.7 g. (yield: 75%, calculated on sulphochloride).

11.85 g. (0.049 mol.) of this 97% sulphinate was treated, in accordance with Example III, in 145 ml. of dry benzene with 10.3 g. (0.055 mol.) of P.C.M. After recrystallization from benzene, 11.1 g. of trichlormethyl-p-propionylaminobenzene-thiolsulphonate with a melting point of 128° to 129° C. was obtained (yield: 62% with respect to sulphinate).

VIII. TRICHLORMETHYL-p-CAPROYLAMINO-BENZENE-THIOLSULPHONATE

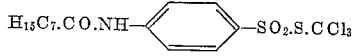

In the manner similar to that described with reference to the foregoing examples p-caproylaminobenzene-sulphochloride was produced from 20.0 g. of caproylanilide (0.09 mol.) and 58.3 g. (0.5 mol.) of chlorsulphonic acid. By dissolving the raw reaction product (a viscous oil) in benzene and by precipitating, while cooling, carefully with petroleum ether, 17.6 g. of not completely pure p-caproylaminobenzene-sulphochloride with a melting point of 55° to 62° C. was obtained.

17.6 g. of this sulphochloride was reduced with 21 g. of $Na_2SO_3.7H_2O$ in 60 ml. of water while 7 ml. of 50% caustic soda at about 30° C. was added in drops. After the reaction mixture had been worked up in accordance with Example VII 13 g. of the product with a content of 86% of pure p-caproylaminobenzene-sulphinic acid-sodium was obtained (yield: 66%, calculated on sulphochloride).

12.5 g. of the sodium salt of p-caproylaminobenzene-sulphinic acid (content: 86%, 0.035 mol.) was caused to react in 200 ml. of dry benzene in the manner described in the foregoing examples with 8.4 g. (0.045 mol.) of P.C.M. After a reaction period of 3 hours, the reaction mixture was filtered hot and the filtrate was evaporated to a total weight of 22 g. This residue was applied to a column of slightly acid alumina. The column was washed out with petroleum ether, then with benzene. After evaporation of the benzene fraction, a light yellow, viscous oil remained, which did not crystallize. $N_D^{20}$: 1.5842, yield 12.5 g. (82%, calculated on sulphinate).

IX. TRICHLORMETHYL-p-VALEROYLAMINO-BENZENE-THIOLSULPHONATE

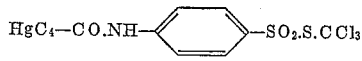

p-Valeroylaminobenzene-sulphochloride was produced by the method described in Example VII from 17.7 g. of valeroylanilide (0.1 mol.) and 58.2 g. (0.5 mol.) of chlorsulphonic acid. 20 g. of the product were obtained with melting point of 95° to 100° C.

14.0 g. (0.05 mol.) of this raw sulphochloride was reduced in the manner described above with the aid of 20 g. of $Na_2SO_3.7H_2O$ in 60 ml. of water with the dropwise addition of 6 ml. of 50% caustic soda at a temperature of about 40° C. Yield: 8.1 g. of the product with a content of 97% of pure p-valeroylaminobenzene-sulphinic acid-sodium (59%, calculated on sulphochloride).

10.5 g. (0.039 mol.) of this sulphinate was treated in the known manner in 170 ml. of dry benzene with 8.16 g. of P.C.M. (0.044 mol.). The raw reaction mixture was worked up in accordance with Example V, so that 10.3 g. (68%, calculated on sulphinic acid) of tricholmethyl-p-valeroylaminobenzene-thiolsulphonate with a melting point of 78° to 80° C. was obtained.

X. TRICHLORMETHYL-m-ACETAMINOBENZENE-THIOLSULPHONATE

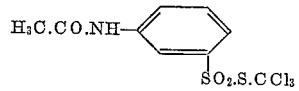

5.0 g. of the sodium salt of m-acetaminobenzene-sulphinic acid, produced by a method described in J. Chem. Soc. (1926), page 2700, was dissolved in 50 ml. of water and shaken vigorously with 4.25 g. of P.C.M. A crystalline precipitation was obtained, which, subsequent of filtering, washing, drying and recrystallizing by dissolving it in benzene and precipitating it with petroleum-ether (melting point 40 to 60° C.), produced 7.1 g. of trichlormethyl-m-acetaminobenzene-thiosulphonate with a melting point of 124 to 125° C. (yield: 89%, calculated on sulphinate).

XI. TRICHLORMETHYL-o-ACETAMINOBENZENE-THIOLSULPHONATE

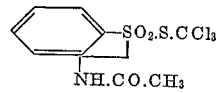

A neutral solution of 4.0 g. of the sodium salt of o-acetaminobenzene-sulphinic acid (produced in accordance with a method given in Annalen 380, page 309 (1911)) in 100 ml. of water was shaken vigorously with 3.9 g. of perchlormethylmercaptan (P.C.M.). The deposited crystalline compound was then filtered off, washed with water and dried. The compound was recrystallized from a mixture of 40 parts of benzene and 60 parts of petroleum ether.

The yield was 4.0 g. (i.e. 64%, calculated on the sulphinic acid sodium) of trichlormethyl-o-acetaminobenzene-thiolsulphonate. The compound melted at 87 to 88° C.

Table A₁

| | Concentration | Phytotoxicity | | | Fungitoxicity, LD/₉₅ |
|---|---|---|---|---|---|
| | | Broad bean | Bush bean | Ind. cr. | |
| I. Cl₃.CS.SO₂—⟨ ⟩ | 10 / 3 | 5 / 4 | 6 / 5 | 6 / 6 | 5.9  5.9 |
| II. Cl₃.CS.SO₂—⟨ ⟩—NH.CO.CH₃ | 10 / 3 | 0 / 0 | 0 / 0 | 0 / 0 | 6.2  6.5 |
| III. Cl₃.CS.SO₂—⟨ ⟩—NH.CO.H | 10 / 3 | 2 / 1 | 0 / 0 | 6 / 4 | 6.8  6.5 |
| IV. Cl₃.CS.SO₂—⟨ ⟩—NH.CO.CH²CH:CH₃ | 10 / 3 | --- / --- | --- / --- | 0 / 0 | 6.5  6.2 |
| V. Cl₃.CS.SO₂—⟨ ⟩—NH.CO.CH(CH₃)₂ | 10 / 3 | 1 / 0 | 2 / 0 | 3 / 1 | 5.9  5.9 |
| VI. Cl₃.CS.SO₂—⟨ ⟩—NH.CO.CH₂CH₂CH₃ | 10 / 3 | 1 / 1 | 0 / 0 | 4 / 3 | 6.2  6.5 |
| VII. Cl₃.CS.SO₂—⟨ ⟩—NH.CO.CH₂.CH₃ | 10 / 3 | 0 / 0 | 0 / 0 | 1 / 1 | 6.2  6.2 |
| VIII. Cl₃.CS.SO₂—⟨ ⟩—NH.CO.(CH₂)₆CH₃ | 10 / 3 | 0 / 0 | 0 / 0 | 1 / 0 | ±4.1 |
| IX. Cl₃.CS.SO₂—⟨ ⟩—NH.CO.(CH₂)₃CH₃ | 10 / 3 | 1 / 1 | 0 / 0 | 2 / 1 | 5.9  5.9 |

Table A₂

| | Concentration | Phytotoxicity | | | Fungitoxicity, LD/₉₅ |
|---|---|---|---|---|---|
| | | Broad bean | Bush bean | Ind. cr. | |
| Cl₃.CS.SO₂⟨ ⟩ | 10 / 3 | 5 / 5 | 6 / 6 | 6 / 6 | 6.2  6.2 |
| XI. Cl₃.CS.SO₂—⟨ ⟩ with CH₃.CO.NH | 10 / 3 | 2 / 1 | 4 / 2 | 5 / 4 | 5.3  5.3 |
| X. Cl₃.CS.SO₂—⟨ ⟩ with NH.CO.CH₃ | 10 / 3 | 0 / 0 | 0 / 0 | 0 / 0 | 6.5  6.5 |
| II. Cl₃.CS.SO₂—⟨ ⟩—NH.CO.CH₃ | 10 / 3 | 0 / 0 | 0 / 0 | 0 / 0 | 6.8  6.5 |

(B) Compounds of the general formula:

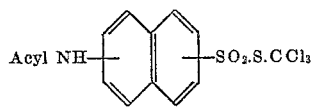

Acyl NH—[naphthalene]—SO₂.S.CCl₃

XII. TRICHLORMETHYL-α-NAPHTHALENE-THIOLSULPHONATE

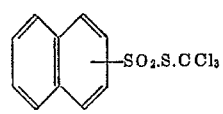

—SO₂.S.CCl₃

10.0 g. of α-naphthalene-sulphinic acid (0.052 mol.), known from Ber. 32 1141 (1899), was dissolved in an equivalent quantity of 2 N caustic soda. After the addition of 1.5 g. of sodium carbonate and 10.6 g. of P.C.M. (0.057 mol.) the reaction mixture was shaken at room temperature for 25 minutes. After filtering off, washing and drying of the precipitate obtained, 14.5 g. of the product was obtained, which yielded, subsequent to recrystallization from petroleum-ether, trichlormethyl-α-naphthalene-thiolsulphonate with a melting point of 72 to 73° C.

XIII. TRICHLORMETHYL-4-ACETYLAMINO-NAPHTHALENE-1-THIOLSULPHONATE

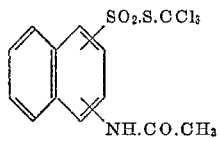

SO₂.S.CCl₃ / NH.CO.CH₃

14.2 g. of the sodium salt of 4-acetylamino-naphthalene-1-sulphinic acid, produced by a method as described in J. Chem. Soc. (1926), page 2700, was treated in 200 ml. of dry benzene in the manner described in the foregoing examples, with 11.9 g. of P.C.M. After working up the reaction mixture, 4 g. of trichlormethyl-4-acetylamino-naphthalene-1-thiolsulphonate with a melting point of 156 to 158° C. was obtained (yield: 18%, calculated on sulphinate).

Table B

| | | Concentration | Phytotoxicity | | | Fungitoxicity, LD/95 |
|---|---|---|---|---|---|---|
| | | | Broad bean | Bush bean | Ind. cr. | |
| XII. | naphthalene-$SO_2$-$SCCl_3$ | 10<br>3 | 1<br>1 | 2<br>2 | 3<br>2 | 6.2  6.5 |
| XIII. | naphthalene-$SO_2.S.CCl_3$, -$NH.CO.CH_3$ | 10<br>3 | 0 | 0 | 0 | 6.2  6.2 |

(C) Compounds of the general formula:

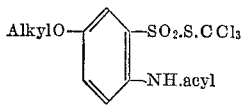

XIV. TRICHLORMETHYL-p-METHOXYBENZENE-THIOLSULPHONATE

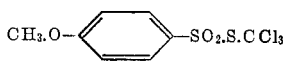

15 g. of p-methoxybenzene-sulphochloride (0.073 mol.) was converted by the method described in Example VII with 36.8 g. of $Na_2SO_3.7H_2O$ in 75 ml. of water with the dropwise addition of 50% caustic soda into the sodium salt of p-methoxybenzene-sulphinic acid. The product obtained (12.1 g.) contained 95% of the pure sulphinate.

20.0 g. of this 95% sodium salt (0.1 mol.) was treated by the method described in the foregoing examples in 260 ml. of dry petroleum-ether (boiling point 60 to 80° C.) with 26.0 g. (0.14 mol.) of P.C.M. Upon cooling the filtered hot reaction mixture to −5° C., crystals were separated out, which, after filtering from petroleum-ether (boiling point 60 to 80° C.) were recrystallized. Thus 20.2 g. of trichlormethyl-p-methoxybenzene-thiolsulphonate with a melting point of 51 to 53° C. was obtained (yield: 62%, calculated on sulphinate).

XV. TRICHLORMETHYL-3-ACETAMINO-4-METHOXY-BENZENE-THIOLSULPHONATE

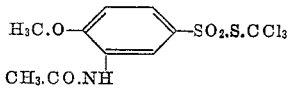

49.5 g. (0.3 mol) of O-acetaminoanisol was added in spoonfuls while stirring it at a temperature of 15° C., to 168 g. (1.5 mol.) of chlorsulphonic acid. The mixture was then heated at 50° C. for about half an hour. After cooling the reaction mixture was poured out on ice. The white precipitation was filtered off, dried and recrystallized from benzene. Thus 58 g. of 3-acetamino-4-methoxy-benzene-sulphochloride with a melting point of 136 to 140° C. was obtained.

19.5 g. (0.074 mol.) of this sulphochloride was reduced in accordance with Example VII with the aid of a solution of 36 g. of $Na_2SO_3.7H_2O$ in 75 ml. of water with dropwise addition of 50% caustic soda. Thus 18.1 g. of the product with a content of 86% of pure 3-acetamino-4-methoxy-benzene-sulphinic acid-sodium was obtained.

15.8 g. of this 86% sulphinic acid (0.054 mol.) was dissolved with 1.5 g. of sodium bicarbonate in 100 ml. of water and, in accordance with Example VII, treated with 10.0 g. of P.C.M. (0.054 mol.). The finely divided precipitate was filtered off, thoroughly washed with water, dried and recrystallized from benzene. Thus 17.5 g. of trichlormethyl-3-acetamino-4-methoxybenzene-thiosulphonate with a melting point of 138 to 143° C. (while decomposing) was obtained. (Yield: 86%, calculated on sulphinate.)

XVII. TRICHLORMETHYL-2-ETHOXY-5-ACETYLAMINOBENZENE-THIOSULPHONATE

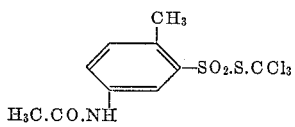

9.38 g. of the sodium salt of 2-methyl-5-acetylamino-benzene-sulphinic acid produced by a method as described in J. Chem. Soc. 123, page 2386 (1923), (0.04 mol.) was treated in 120 ml. of dry benzene with 8.5 g. (0.045 mol.) of P.C.M. After filtering the hot reaction mixture, 9.0 g. of trichlormethyl-2-methyl-5-acetyl-aminobenzene-thiosulphonate crystallized out, which, after recrystallization from benzene, had a melting point between 157 and 159° C. (Yield: 62%, calculated on sulphinate.)

XVII. TRICHLORMETHYL-2-ETHOXY-5-ACETYLAMINOBENZENE-THIOSULPHONATE

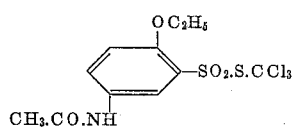

10.9 g. (0.041 mol.) of the sodium salt 2-ethoxy-5-acetylaminobenzene-sulphinic acid was treated in the conventional manner in 120 ml. of dry benzene with 8.77 g. (0.047 mol.) of P.C.M. From the filtrate of the hot reaction mixture, subsequent to cooling, crystallized out 8.1 g. (50%) of trichlormethyl-2-ethoxy-5-acetamino-benzene-thiosulphonate, which, subsequent to recrystallization from benzene, melted at 150 to 152° C.

Table C

| | Concentration | Phytotoxicity | | | Fungi-toxicity, LD 95 |
|---|---|---|---|---|---|
| | | Broad bean | Bush bean | Ind. cr. | |
| XIV. Cl₃—CS—SO₂—⟨C₆H₄⟩—O.CH₃ | 10<br>3 | 4<br>4 | 4<br>3 | 6<br>5 | } 6.8  6.8 |
| XV. Cl₃.CS.SO₂—⟨C₆H₃(NH.CO.CH₃)⟩—O.CH₃ | 10<br>3 | 0<br>0 | 0<br>0 | 1<br>0 | } 5.9  5.9 |
| XVI. Cl₃.CS.SO₂—⟨C₆H₃(NH.CO.CH₃)⟩—CH₃ | 10<br>3 | 1<br>0 | 0<br>0 | 1<br>0 | } 6.2  6.5 |
| XVII. Cl₃.CS.SO₂—⟨C₆H₃(NH.CO.CH₃)⟩—O.C₂H₅ | 10<br>3 | 0<br>0 | 0<br>0 | 0<br>0 | } 5.9  5.9 |

(D) Compounds of the general formula:

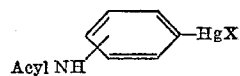

Acyl NH—⟨C₆H₄⟩—HgX wherein X designates an inorganic or an organic anion.

XIX. P-ACETYLAMINO-PHENYL-MERCURI-ACETATE

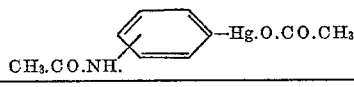

CH₃.CO.NH—⟨C₆H₄⟩—Hg.O.CO.CH₃

This compound was produced by treating an aqueous solution of mercury acetate with aniline, in accordance with a method from Berichte der deutschen chemischen Gesellschaft, 35, 2032 (1902), whereby p-aminophenyl-mercury acetate crystallized out, and can be converted after drying, with acetic acid anhydride, into p-acetamino-phenyl-mercury acetate.

Table D₁

| | Concentration | Cucumber | Phytotoxicity | | | | | |
|---|---|---|---|---|---|---|---|---|
| | | | Broad bean | Bush bean | Ind. cr. | Peas | Tomato | Cyclamen |
| XVIII. CH₃.COO.Hg—⟨C₆H₅⟩ | 10<br>3 | 5<br>3 | 2<br>1 | 5<br>4 | 5<br>3 | 1<br>0 | 6<br>5 | 3<br>3 |
| XIX. CH₃—COOHg—⟨C₆H₄⟩—NH—COCH₃ | 10<br>3 | 0<br>0 | 0<br>0 | 0<br>0 | 0<br>0 | 0<br>0 | 0<br>0 | 0<br>0 |

Table D₂

| | Fungitoxicity LD 95 | | | | | | | | | | |
|---|---|---|---|---|---|---|---|---|---|---|---|
| | Fusarium culmorum | Sclerotinia fructigena | Mycosphaerella pinodes | Aspergillus niger | Alternaria tenuis | Botrytis allii | Glomerella cingulata | Rhizopus nigricans | Gladosporium cucumerinum | Penicillium italicum | Average |
| XXXII. CH₃—COOHg—⟨C₆H₅⟩ | 7.4 | 7.4 | 7.4 | 8.6 | 7.4 | 7.4 | 7.4 | 7.4 | 8.2 | 7.8 | 7.6 |
| XXXIII. CH₃—COOHg—⟨C₆H₄⟩—NHCOCH₃ | 6.0 | 6.0 | 6.0 | 6.8 | 6.0 | 6.0 | 6.8 | 6.8 | 6.4 | 6.0 | 6.3 |

Table D₃

| | Concentration | Bactericidal effect LD₉₅ | | | | | |
|---|---|---|---|---|---|---|---|
| | | Salmonella thyrium | Micrococcus aureus | Pseudomonas pyocyaneas | Escherichia coli | Mycobacterium phlei | Bacillus subtilius |
| XVIII. 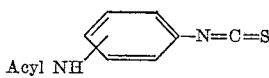 | —10⁻⁹ | 9 | 9 | 8 | 9 | 9 | 9 |
| XIX. 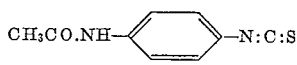 | 10⁻⁵ | 8 | 9 | 8 | 8 | 9 | 9 |

(E) Compounds of the general formula:

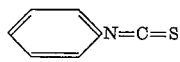

XX. PHENYLISOTHIOCYANATE $$\text{C}_6\text{H}_5-\text{N}=\text{C}=\text{S}$$

XXI. PARA-ACETAMINO-PHENYL-ISOTHIO-CYANATE $$\text{CH}_3\text{CO.NH}-\text{C}_6\text{H}_4-\text{N:C:S}$$

This compound is described in literature and may, for example, be produced in accordance with a precipitation of J. Am. Chem. Soc. 45, 2354 (1923), by coupling p-acetamino-aniline and carbon disulphide, followed by decomposition of the obtained N,N'-bis-(p-acetoaminophenyl)thiourea with acetic acid anhydride.

pound selected from the group consisting of compounds having the following structural formulae:

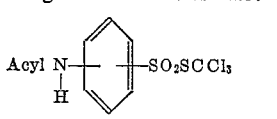

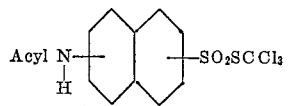

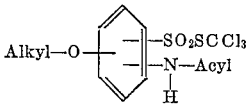

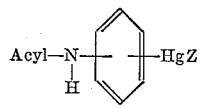

Table E

| | Concentration | Phytotoxicity | | | | | | | Fungitoxicity, LD₉₅ |
|---|---|---|---|---|---|---|---|---|---|
| | | Broad bean | Bush bean | Ind. cr. | Cucumber | Potato | Tobacco | Chrysanthemum | |
| XX. $S=C=N-\bigcirc$ | 0 / 3 | 6-5 / 2-2 | 6-5 / 4-4 | 6-6 / 4-4 | 6-6 / 4-5 | 6-5 / 4-2 | 5 / 3 | 3 / 1 | 2.9 / 2.9 / 3.2 |
| XXI. $S=C=N-\bigcirc-NHCOCH_3$ | 10 / 3 | 0-0 | 0-0 | 0-0 | 0-0 | 0-0 | 0 | 0 | 5.6 / 5.6 / 5.9 |

From the experiments it is found that compounds having an acylamino group have a smaller phytotoxicity than the corresponding compounds with acyl-amino bonds. However, in many cases the fungicidal and/or bactericidal effect remains constant or decreases to a materially smaller degree than the phytotoxicity. In certain cases the fungicidal and/or bactericidal effect has even increased.

From Table D₁ it is evident that phenyl-mercuri-acetate in concentrations of 0.05% is evidently harmful to tomato plants. However, in a concentration of 10%, the p-acetylamino-derivative does not produce any visible damage. The phytotoxicity has thus been reduced by at least 200 times, owing to the introduction of the acetylamino group. From Table D₂ it is evident that the fungitoxicity of the acetamino-phenyl-mercuri-acetate is only 20 times lower than that of the phenyl-mercury acetate.

What is claimed is:
1. A method of destroying bacteria and fungi harmful to plants comprising contacting the plants with a non-phytotoxic fungicidally and bactericidally active compound selected from the group consisting of compounds having the following structural formulae:

wherein Z represents anions selected from the group consisting of lower aliphatic acid residues, chlorine and bromine ions

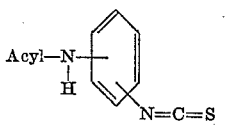

wherein acyl in all of said formulae represents the acyl residue of a monocarboxylic acid selected from the group consisting of saturated aliphatic hydrocarbon, olefinically unsaturated hydrocarbon, phenylalkyl and naphthoic acids containing from 1 to 18 carbon atoms.

2. The method of claim 1 in which the active compound is employed in the form of an aerosol containing a solvent for the compound and a gaseous propellent therefor.

3. The method of claim 1 in which the active compound is employed in the form of a mixable oil containing an inert solvent for the compound and an emulsifier therefor.

4. The method of claim 1 in which the active compound is employed in the form of a sprayable powder containing an inert solid carrier therefor.

5. The method of claim 1 in which the active compound is employed in the form of a seed protecting powder containing an adhesive and a solid inert carrier therefor.

6. The method of claim 1 in which the active compound is employed in the form of a dusting composition containing an inert solid absorbent powder therefor.

7. A method of destroying bacteria and fungi harmful to plants comprising, contacting the plants with a non-phytotoxic pesticidal composition containing a compound corresponding to the formula:

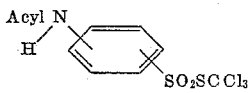

wherein acyl represents the acyl residue of a monocarboxylic acid selected from the group consisting of saturated aliphatic hydrocarbon, olefinically unsaturated hydrocarbon, phenylalkyl and naphthoic acids containing from 1 to 18 carbon atoms, and an inert carrier therefor.

8. A method of destroying bacteria and fungi harmful to plants comprising, contacting the plants with a non-phytotoxic pesticidal compositions containing a compound corresponding to the formula

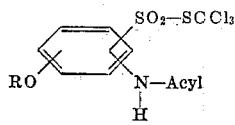

wherein R represents a hydrocarbon alkyl radical and acyl represents the acyl residue of a monocarboxylic acid selected from the group consisting of saturated aliphatic hydrocarbon, olefinically unsaturated hydrocarbon, phenylalkyl and naphthoic acids containing from 1 to 18 carbon atoms and an inert carrier therefor.

9. A method of destroying bacteria and fungi harmful to plants comprising, contacting the plants with a non-phytotoxic pesticidal composition containing a compound corresponding to the formula:

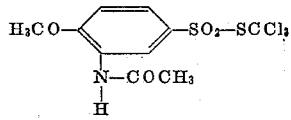

and an inert carrier therefor.

10. A method of destroying bacteria and fungi harmful to plants comprising, contacting the plants with a non-phytotoxic pesticidal composition containing a compound corresponding to the formula:

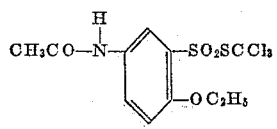

and an inert carrier therefor.

11. A method of destroying bacteria and fungi harmful to plants comprising, contacting the plants with a non-phytotoxic pesticidal composition containing a compound corresponding to the formula:

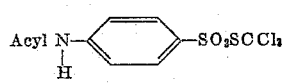

wherein Acyl represents the acyl residue of a monocarboxylic acid selected from the group consisting of saturated aliphatic hydrocarbon, olefinically unsaturated hydrocarbon, phenylalkyl and naphthoic acids containing from 1 to 18 carbon atoms and an inert carrier therefor.

12. A method of destroying bacteria and fungi harmful to plants comprising, contacting the plants with a non-phytotoxic pesticidal composition containing a compound corresponding to the formula:

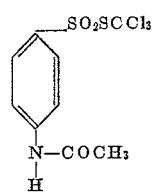

and an inert carrier therefor.

13. A method of destroying bacteria and fungi harmful to plants comprising, contacting the plants with a non-phytotoxic pesticidal composition containing a compound corresponding to the formula:

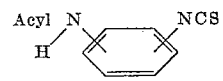

wherein Acyl represents the acyl residue of a monocarboxylic acid selected from the group consisting of saturated aliphatic hydrocarbon, olefinically unsaturated hydrocarbon, phenylalkyl and naphthoic acids containing from 1 to 18 carbon atoms and an inert carrier therefor.

14. A method of destroying bacteria and fungi harmful to plants comprising, contacting the plants with a non-phytotoxic pesticidal composition containing a compound corresponding to the formula:

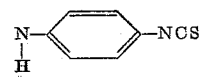

and an inert carrier therefor.

15. A method of destroying bacteria and fungi harmful to plants comprising, contacting the plants with a non-phytotoxic pesticidal composition containing a compound corresponding to the general formula: Acyl NH—Ar—HgZ wherein Acyl represents the acyl residue of a monocarboxylic acid selected from the group consisting of saturated aliphatic hydrocarbon, olefinically unsaturated hydrocarbon, phenyl-alkyl and napthoic acids containing from 1 to 18 carbon atoms, Ar designates a phenyl residue in which at least one nuclear hydrogen atom is replaced by the fungicidally and bactericidally active radical HgZ wherein Z is an anion selected from the group consisting of a residue of a lower aliphatic acid, chlorine ions and bromine ions and an inert carrier therefor.

16. A method of destroying bacteria and fungi harmful to plants comprising, contacting the plants with a non-phytotoxic pesticidal composition containing a compound corresponding to the formula:

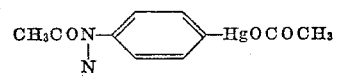

and an inert carrier therefor.

17. A method of destroying bacteria and fungi harmful to plants comprising, contacting the plants with a non-phytotoxic pesticidal composition corresponding to the formula:

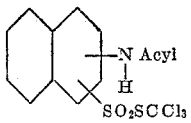

wherein Acyl represents the acyl residue of a monocarboxylic acid selected from the group consisting of saturated aliphatic hydrocarbon, olefinically unsaturated hydrocarbon, phenylalkyl and naphthoic acids containing from 1 to 18 carbon atoms and an inert carrier therefor.

18. A method of destroying bacteria and fungi harmful to plants comprising, contacting the plants with a non-phytotoxic pesticidal composition containing a compound corresponding to the formula

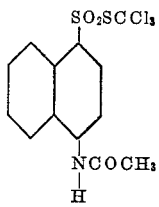

and an inert carrier therefor.

References Cited in the file of this patent

UNITED STATES PATENTS

| | | |
|---|---|---|
| 1,969,857 | Schepss | Aug. 14, 1934 |
| 2,085,066 | Andersen | June 29, 1937 |
| 2,167,966 | Andersen | Aug. 1, 1939 |
| 2,340,757 | Kaase et al. | Feb. 1, 1944 |
| 2,376,291 | Sowa | May 15, 1946 |
| 2,551,734 | Gillaspie | May 8, 1951 |
| 2,637,677 | Dinnerstein | May 5, 1953 |

FOREIGN PATENTS

| | | |
|---|---|---|
| 173,225 | Italy | Sept. 22, 1938 |

OTHER REFERENCES

Curtius et al.: "J. Prak. Chem.," vol. 112, pp. 119, 123, 128 and 129 (1926).